(12) United States Patent
Dai et al.

(10) Patent No.: US 12,077,008 B2
(45) Date of Patent: Sep. 3, 2024

(54) DIGITAL PRINTING FLOORBOARD PROCESSING TECHNOLOGY

(71) Applicant: Zhejiang Kingdom New Material Group Co., Ltd., Jiaxing (CN)

(72) Inventors: Huibin Dai, Jiaxing (CN); Peidong Zhao, Jiaxing (CN); Tao Wang, Jiaxing (CN); Lijie Dong, Jiaxing (CN)

(73) Assignee: ZHEJIANG KINGDOM NEW MATERIAL GROUP CO., LTD., Jiaxing (CN)

( * ) Notice: Subject to any disclaimer, the term of this patent is extended or adjusted under 35 U.S.C. 154(b) by 387 days.

(21) Appl. No.: 16/767,107

(22) PCT Filed: Nov. 29, 2019

(86) PCT No.: PCT/CN2019/121930
§ 371 (c)(1),
(2) Date: May 26, 2020

(87) PCT Pub. No.: WO2021/068383
PCT Pub. Date: Apr. 15, 2021

(65) Prior Publication Data
US 2021/0402817 A1    Dec. 30, 2021

(30) Foreign Application Priority Data

Oct. 12, 2019    (CN) .......................... 201910965685.6

(51) Int. Cl.
*B41M 3/06*    (2006.01)
*B29C 59/02*    (2006.01)
(Continued)

(52) U.S. Cl.
CPC ............ *B41M 3/06* (2013.01); *B29C 59/026* (2013.01); *B41M 5/0017* (2013.01); *B41M 7/0045* (2013.01)

(58) Field of Classification Search
CPC .... B41M 3/06; B41M 5/0017; B41M 7/0045; B41M 7/00; B41M 7/0036; B41M 7/0054;
(Continued)

(56) References Cited

U.S. PATENT DOCUMENTS

2009/0197036 A1* 8/2009 Hwang ................... B32B 21/02
428/479.6
2009/0252925 A1* 10/2009 Provoost ................. B44C 3/025
428/151
(Continued)

FOREIGN PATENT DOCUMENTS

WO    WO 2008/061791    *    5/2008

*Primary Examiner* — Austin Murata
(74) *Attorney, Agent, or Firm* — MUNCY, GEISSLER, OLDS & LOWE, PC

(57) ABSTRACT

A method for processing floorboards using digital printing, comprising: preparing a base material layer; arranging a printing layer on the base material layer, wherein the printing layer is directly printed by a digital printing apparatus and is formed on a surface of the base material layer; and arranging a protection layer on the printing layer, wherein the protection layer is attached to the printing layer by means of one or a combination of processes selected from roll-coating, shower-coating, spray-coating, transfer-printing and printing, wherein the protection layer displays one or a combination of artistic effects selected from flat, sunken, raised, finely creased, patterned and crackled by means of one or a combination of processes selected from levelling, flatting, printing, embossing, corroding, carving, brushing and crackling. According to the processing technology of the present disclosure, various patterns can be designed and processed in different ways or combinations according to the user's requirements.

7 Claims, 3 Drawing Sheets

(51) Int. Cl.
*B41M 5/00* (2006.01)
*B41M 7/00* (2006.01)

(58) Field of Classification Search
CPC ............ B41M 5/0064; B41M 5/0047; B41M 5/0011; B41M 7/0027; B41M 7/0081; B29C 53/18; B29C 59/026; B29C 2063/0008
USPC .......................................................... 264/40
See application file for complete search history.

(56) References Cited

U.S. PATENT DOCUMENTS

| | | | |
|---|---|---|---|
| 2010/0098963 A1* | 4/2010 | Dohring | B05D 7/06 427/532 |
| 2011/0171412 A1* | 7/2011 | Dohring | B44C 5/04 428/58 |
| 2018/0043669 A1* | 2/2018 | Iriyama | C08J 7/043 |
| 2020/0325689 A1* | 10/2020 | Li | E04F 13/072 |

* cited by examiner

DIGITAL PRINTING FLOORBOARD PROCESSING TECHNOLOGY

TECHNICAL FIELD

This disclosure generally relates to the technical field of floorboards, and more particularly, to a digital printing floorboard processing technology.

BACKGROUND

As using plastic material instead of natural timbers significantly reduces damage to the environment, the development of plastic floorboards has become a trend. To make the plastic floor aesthetically appealing, various flat and stereoscopic patterns are printed on the printing layer. However, it is difficult to achieve an integral three-dimensional visual effect because these patterns are normally monotonous. Even worse, the flat pattern does not accurately correspond to the stereoscopic pattern.

SUMMARY

The purpose of the present disclosure is to provide a digital printing floorboard processing technology, which designs and processes patterns in different ways or combinations according to the user's requirements, makes the stereoscopic patterns aesthetically appealing, improves the production efficiency, and ensures the stable quality of products.

To achieve the above purpose, the present disclosure adopts the following technical solution: a method for processing floorboards using digital printing, including: preparing a base material layer; arranging a printing layer on the base material layer, wherein the printing layer is directly printed by a digital printing apparatus and is formed on a surface of the base material layer; and arranging a protection layer on the printing layer, wherein the protection layer is attached to the printing layer by means of one or a combination of processes selected from roll-coating, shower-coating, spray-coating, transfer-printing and printing, wherein the protection layer displays one or a combination of artistic effects selected from flat, sunken, raised, finely creased, patterned and crackled by means of one or a combination of processes selected from levelling, flatting, printing, embossing, corroding, carving, brushing and crackling.

In another preferred embodiment, the method for processing floorboards using digital printing, further includes: arranging an adhesion layer on the base material layer, wherein the adhesion layer is transparent or solid-colored; and arranging a balance layer below the base material layer, wherein the balance layer is made of UV glue or various plastic films.

In another preferred embodiment, the method for processing floorboards using digital printing, further includes: hot-pressing the base material layer using a steel plate or a steel roll to form stereoscopic patterns and matching points on the surface of the base material layer; roll-coating a UV paint with adhesion ability on an upper surface of the base material layer, coating a UV balance layer on a bottom surface of the base material layer, and curing with a UV lamp; sensing the matching points by a digital printing apparatus and printing patterns on the surface of the base material layer, wherein the patterns is correspond to the stereoscopic patterns on the base material layer; forming the protection layer on a surface of the patterns through spray-coating the UV glue, and half-curing with the UV lamp; and brushing a surface of the protection layer with a steel brush to form fine lines at positions where the stereoscopic patterns are relatively flat, and fully curing with the UV lamp.

In another preferred embodiment, the method for processing floorboards using digital printing, further includes: roll-coating a UV paint with adhesion ability on an upper surface of the base material layer to form an adhesive layer, coating a UV balance layer on a bottom surface of the base material layer, and curing with a UV lamp; printing patterns using a UV ink by a digital printing apparatus on a surface of the adhesion layer; strewing aluminum oxide, silica, stone grains or fine sand on portions designed to be stereoscopic; forming a sand-stone layer by attaching the aluminum oxide, silica, stone grains or fine sand to the portions designed to be stereoscopic using the UV lamp; and forming concave-convex patterns by spray-coating the protection layer on the surface of the sand-stone layer and fully curing with the UV lamp, wherein the protection layer is a UV protection layer.

In another preferred embodiment, the method for processing floorboards using digital printing, further includes: roll-coating a UV paint with adhesion ability on an upper surface of the base material layer to form an adhesive layer, coating a UV balance layer on a bottom surface of the base material layer, and curing with a UV lamp; printing patterns on a surface of the adhesive layer by a digital printing apparatus; forming the protection layer on a surface of the patterns through showering-coating a UV glue; printing a transparent UV material on portions designed to be stereoscopic on a surface of the protection layer to enable the transparent UV material to sink, and half-curing with the UV lamp; and brushing beyond sunken portions with a steel brush to form fine lines, and fully curing with the UV lamp.

In another preferred embodiment, the method for processing floorboards using digital printing, further includes: roll-coating a white UV paint with adhesion ability on an upper surface of the base material layer to form an adhesive layer, coating a UV balance layer on a bottom surface of the base material layer, and curing with a UV lamp; printing patterns on a surface of the adhesive layer by a digital printing apparatus; roll-coating a PUR glue on the patterns, cooling, drying and curing; shower-coating a UV glue on the patterns to form the protection layer; printing one or more layers of coating on portions designed to be stereoscopic on the protection layer, wherein the one or more layers of coating has the same color as the portions designed to be stereoscopic, wherein the one or more layers of coating is configured to enable the portions to sink so that a layering effect can be achieved, and half-curing with the UV lamp; and forming stereoscopic patterns with depths different from that of sunken portions by printing a corrosive coating beyond the sunken portions, brushing off corroded portions with a fur brush after reaction, and curing with the UV lamp.

In another preferred embodiment, the method for processing floorboards using digital printing, further includes: roll-coating a transparent UV paint with adhesion ability on an upper surface of the base material layer to form an adhesive layer, coating a UV balance layer on a bottom surface of the base material layer, and curing with a UV lamp; printing patterns on a surface of the adhesion layer by a digital printing apparatus; roll-coating a PUR glue on the patterns, cooling, drying and curing; shower-coating a UV glue on the patterns to form the protection layer, and half-curing; brushing the protection layer with a steel brush to form fine lines; forming stereoscopic patterns with different depths by printing a corrosive coating on portions designed to be stereoscopic, adjusting a printing amount of the corrosive coating according to different depths, brushing off corroded portions with a fur brush, and half-curing with the UV lamp; and roll-coating a UV protection layer on a surface of the stereoscopic patterns, and fully-curing with the UV lamp.

In another preferred embodiment, the method for processing floorboards using digital printing, further includes: roll-coating a UV paint with adhesion ability on an upper surface of the base material layer to form an adhesive layer, coating a UV balance layer on a bottom surface of the base material layer, and curing with a UV lamp; printing patterns on a surface of the adhesion layer by a digital printing apparatus; forming the protection layer on a surface of the patterns through roll-coating a UV glue, and curing with the UV lamp; forming stereoscopic patterns by printing a raised layer of UV glue on portions designed to be stereoscopic on the protection layer, and curing with the UV lamp; spray-coating a UV glue on the stereoscopic patterns, and fully-curing with the UV lamp.

In another preferred embodiment, the method for processing floorboards using digital printing, further includes: roll-coating a UV paint with adhesion ability on an upper surface of the base material layer to form an adhesive layer, coating a UV balance layer on a bottom surface of the base material layer, and curing with a UV lamp; printing patterns on a surface of the adhesion layer by a digital printing apparatus, wherein portions designed to be stereoscopic are left blank; forming the protection layer on a surface of the patterns through roll-coating a UV glue; forming colored sunken patterns by printing on the portions designed to be stereoscopic with one or more colors, enabling the portions designed to be stereoscopic to sink, and half-curing with the UV lamp; brushing the colored sunken patterns with a steel brush to form fine lines, and fully curing with the UV lamp; roll-coating a UV protection layer on the surface of the stereoscopic patterns, and fully-curing with the UV lamp.

In another preferred embodiment, the method for processing floorboards using digital printing, further includes: roll-coating a UV paint with adhesion ability on a upper surface of the base material layer to form an adhesive layer, and curing with a UV lamp; forming one or more tile patterns on a surface of the adhesion layer by a digital printing apparatus; forming the protection layer on the one or more tile patterns through roll-coating a UV glue, and curing with the UV lamp; printing a UV varnish on the one or more tile patterns to make the one or more tile patterns to raise, thereby forming an artistic effect resembling ceramic tiles with clear boundaries; printing a UV material on the one or more tile patterns, thereby forming a concave-convex effect, and fully-curing with the UV lamp.

Compared with the prior art, the present disclosure has the following advantages: the processing technology of the present disclosure designs and processes patterns in different ways or combinations according to the user's requirements, makes the stereoscopic patterns aesthetically appealing, improves the production efficiency and ensures the stable quality of products.

DETAILED DESCRIPTION

Figures and detailed embodiments are combined hereinafter to further elaborate the technical solutions of the present disclosure.

A digital printing floorboard processing technology comprises a base material, a printing layer arranged on the base material layer, and a protection layer arranged on the printing layer. The printing layer is directly printed by a digital printing apparatus and is formed on the surface of the base material layer. The protection layer is attached to the printing layer by means of one or a combination of processes selected from roll-coating, shower-coating, spray-coating, transfer-printing and printing. The protection layer displays one or a combination of artistic effects selected from flat, sunken, raised, finely creased, patterned and crackled by means of one or a combination of processes selected from levelling, flatting, printing, embossing, corroding, carving, brushing and crackling. The formed artistic effects, including flat, sunken, raised, finely creased, patterned and crackled, are in various colors including transparent, solid-colored and multi-colored. The aforesaid artistic effects are formed above or below the protection layer or form an integral body with the protection layer. Further, the base material layer is provided with a stereoscopic pattern, which corresponds to or does not correspond to the printing layer. Meanwhile, the protection layer is a single-layered or multi-layered structure made of one or more molten lipids including UV glue, PUR glue and PVC resin, etc. Preferably, an adhesion layer, which is transparent or solid-colored, is arranged on the base material layer, and a balance layer, which is made of UV glue or various plastic films, is arranged below the base material layer.

The processing technology of the present disclosure is further described in the following embodiments:

Embodiment 1

Figure 1:
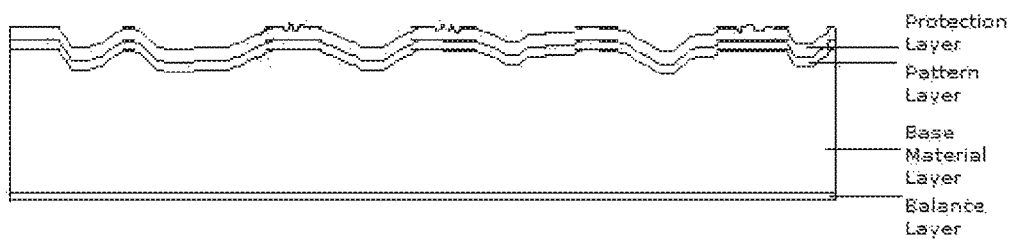
FIG. 1 is a conceptual diagram illustrating an example structure formed by hot-press printing of an embodiment of the present disclosure.

As shown in FIG. 1, the digital printing floorboard processing technology of the present disclosure, comprising the steps of: step 1: hot-pressing a base material using a steel plate or a steel roll, thereby forming stereoscopic patterns and matching points on its surface; step 2: roll-coating a UV paint with adhesion ability on the upper surface of the base material, coating a UV balance layer on the bottom surface of the base material, and curing with a UV lamp; step 3: sensing the matching points by a digital printing apparatus, printing patterns on the surface of the base material, and making the printed patterns correspond to the stereoscopic patterns on the base material; step 4: forming a protection layer on the surface of the patterns through spray-coating a UV glue, and half-curing with a UV lamp; step 5: brushing the surface of the protection layer with a steel brush, thereby forming fine lines at positions where the stereoscopic patterns are relatively flat, and fully curing with a UV lamp.

Embodiment 2

Figure 6:
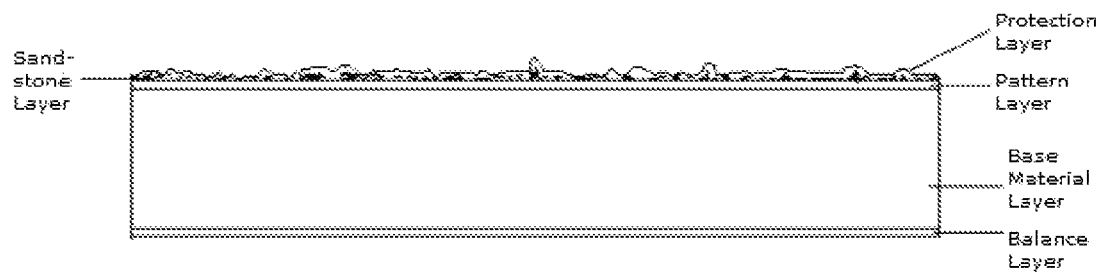
FIG. 6 is a conceptual diagram illustrating a formed example structure of another embodiment of the present disclosure.

As shown in FIG. 6, the digital printing floorboard processing technology, comprising the steps of: step 1: taking a base material with a flat surface; step 2: roll-coating a UV paint with adhesion ability on the upper surface of the base material, coating a UV balance layer on the bottom surface of the base material, and curing with a UV lamp; step 3: printing patterns using a UV ink by a digital printing apparatus on the surface of the adhesion layer, wherein in this step, no curing process is required; step 4: strewing aluminum oxide, silica, stone grains or fine sand on the whole pattern surface or the portions designed to be stereoscopic; step 5: curing with a UV lamp, thus allowing the aluminum oxide, silica, stone grains or fine sand to be attached to the surface of the portions designed to be stereoscopic, wherein in this embodiment, the sand-stone layer with a concave-convex structure is formed by a sand-stone mixture; step 6: spray-coating a UV protection layer on the surface of the sand-stone layer, and fully curing with a UV lamp, thus forming concave-convex patterns. According to the aforesaid arrangement, the concave-convex patterns are also formed on the protection layer.

Embodiment 3

The digital printing floorboard processing technology, comprising the steps of: step 1: taking a base material with a flat surface; step 2: roll-coating a UV paint with adhesion ability on the upper surface of the base material, coating a UV balance layer on the bottom surface of the base material, and curing with a UV lamp; step 3: printing patterns on the surface by a digital printing apparatus; step 4: forming a protection layer on the surface of the patterns through showering-coating a UV glue, wherein in this step, no curing process is required; step 5: printing a transparent special UV material on the portions designed to be stereoscopic on the uncured surface of the protection layer, thus enabling them to sink, and then half-curing with a UV lamp; step 6: brushing the surface beyond the sunken portions with a steel brush, thereby forming fine lines, and fully curing with a UV lamp. In this embodiment, the transparent special UV (VA01) material is capable of form a sunken effect after being in contact with the UV paint.

Embodiment 4

Figure 2:
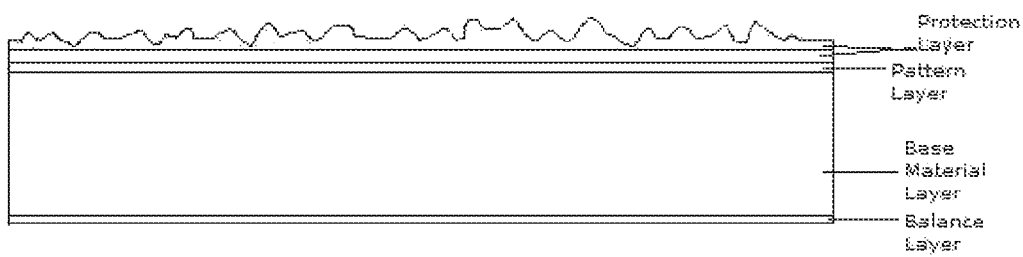
FIG. 2 is a conceptual diagram illustrating a formed example structure of another embodiment of the present disclosure.

The processing technology of the formed structure shown in FIG. 2, comprising the steps of: step 1: taking a base material with a flat surface; step 2: roll-coating a white UV paint with adhesion ability on the upper surface of the base material, coating a UV balance layer on the bottom surface of the base material, and curing with a UV lamp; step 3: printing patterns on the surface by a digital printing apparatus; step 4: forming a PUR protection layer on the surface of the patterns through roll-coating a PUR glue, cooling, drying and curing; step 5: forming a UV protection layer on the PUR protection layer through shower-coating a UV glue, wherein in this step, no curing process is required; step 6: printing one or more layers of coating on the portions designed to be stereoscopic on the uncured UV surface, wherein the coating has the same color as the portions designed to be stereoscopic, thus enabling these portions to sink so that a layering effect can be achieved, and half-curing with a UV lamp; step 7: printing a corrosive coating beyond the sunken portions, brushing off the corroded portions with a fur brush after reaction, thus forming stereoscopic patterns with depths different from that of the sunken portions, and then curing with a UV lamp.

Embodiment 5

Figure 3:
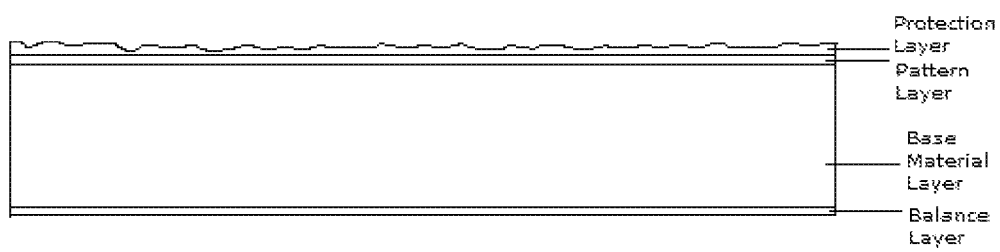
FIG. 3 is a conceptual diagram illustrating a formed example structure of another embodiment of the present disclosure.

The processing technology of the formed structure shown in FIG. 3, comprising the steps of: step 1: taking a base material with a flat surface; step 2: roll-coating a transparent UV paint with adhesion ability on the upper surface of the base material, coating a UV balance layer on the bottom surface of the base material, and curing with a UV lamp; step 3: printing patterns on the surface of the adhesion layer by a digital printing apparatus; step 4: forming a protection layer on the surface of the patterns through roll-coating a PUR glue, cooling, drying and curing; step 5: forming a protection layer on the surface of the patterns through shower-coating a UV glue, and half-curing; step 6: brushing the protection layer with a steel brush, thereby forming fine lines; step 7: printing a corrosive coating on the portions designed to be stereoscopic, adjusting the printing amount according to their depths, brushing off the corroded portions with a fur brush after reaction, thereby forming stereoscopic patterns with different depths, and half-curing with a UV lamp; step 8: roll-coating a UV protection layer on the surface of the stereoscopic patterns, and fully-curing with a UV lamp.

Embodiment 6

Figure 4:
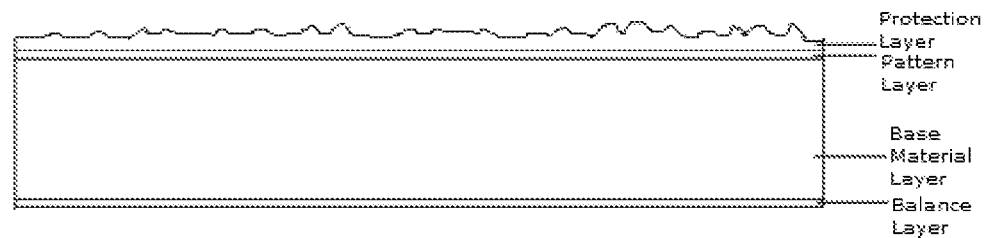
FIG. 4 is a conceptual diagram illustrating a formed example structure of a preferred embodiment of the present disclosure.

The processing technology of the formed structure shown in FIG. 4, comprising the steps of: step 1: taking a base material with a flat surface; step 2: roll-coating a UV paint with adhesion ability on the upper surface of the base material, coating a UV balance layer on the bottom surface of the base material, and curing with a UV lamp; step 3: printing patterns on the surface of the adhesion layer by a digital printing apparatus; step 4: forming a protection layer on the surface of the patterns through roll-coating a UV glue, and curing with a UV lamp; step 5: printing a raised layer of UV glue on the portions designed to be stereoscopic on the protection layer, and curing with a UV lamp; step 6: forming a protection layer on the stereoscopic patterns through spray-coating a UV glue, and fully-curing with a UV lamp.

Embodiment 7

The digital printing floorboard processing technology comprising the steps of: step 1: taking a base material with a flat surface; step 2: roll-coating a UV paint with adhesion ability on the upper surface of the base material, coating a UV balance layer on the bottom surface of the base material, and curing with a UV lamp; step 3: printing patterns on the surface of the adhesion layer by a digital printing apparatus, wherein in this step, the portions designed to be stereoscopic are left blank; step 4: forming a protection layer on the surface of the patterns through roll-coating a UV glue, wherein in this step, no curing process is required; step 5: printing on the blank portions with one or more colors, enabling the colored portions on the protection layer to sink, thus forming colored sunken patterns, and half-curing with a UV lamp; step 6: brushing with a steel brush beyond the sunken patterns, thereby forming fine lines, and fully curing with a UV lamp; step 7: roll-coating a UV protection layer on the surface of the stereoscopic patterns, and fully-curing with a UV lamp.

Embodiment 8

Figure 5:
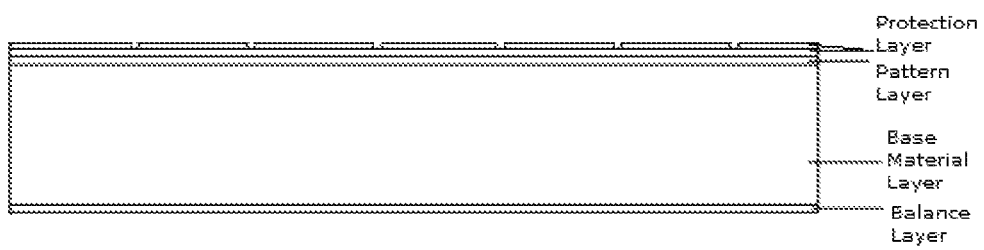
FIG. 5 is a conceptual diagram illustrating a formed example structure of another embodiment of the present disclosure.

The processing technology of the formed structure shown in FIG. 5, comprising the steps of: step 1: taking a base material with a flat surface; step 2: roll-coating a UV paint with adhesion ability on the upper surface of the base material, and curing with a UV lamp; step 3: forming one or more tile patterns on the surface of the adhesion layer by a digital printing apparatus; step 4: forming a protection layer on the surface of the patterns through roll-coating a UV glue, and curing with a UV lamp; step 5: printing a UV varnish on the tile patterns, making the tile patterns to raise, thereby forming an artistic effect resembling ceramic tiles with clear boundaries, wherein in this step, no curing process is required; step 6: printing a special UV (VA01) material on the varnished patterns, thereby forming a concave-convex effect, and fully-curing with a UV lamp. In this embodiment, as the density of the special UV material is slightly higher than that of the varnish, a sunken effect is formed when the UV material is in contact with the varnish.

The above is merely a description of preferred embodiments of the present disclosure, which cannot be understood as a limitation of the claims. Any equivalent modifications of the structure or process described in the specification of the present disclosure shall fall into the scope of the present disclosure.

What is claimed is:

1. A method for processing floorboards using digital printing, comprising:
preparing a base material layer having a flat surface;
roll-coating a UV paint with adhesion ability on an upper surface of the base material layer to form an adhesion layer, coating a UV balance layer on a bottom surface of the base material layer, and curing with a UV lamp;
printing patterns of a printing layer on a surface of the adhesion layer by a digital printing apparatus; and
forming a protection layer on a surface of the patterns through showering-coating a UV glue;
printing a transparent UV material on portions designed to be stereoscopic on a surface of the protection layer to enable the transparent UV material to sink, and half-curing with the UV lamp; and
brushing beyond sunken portions with a steel brush to form fine lines, and fully curing with the UV lamp,
wherein the protection layer displays one or a combination of the artistic effects selected from flat, sunken, raised, finely creased, patterned and crackled by means of one or a combination of processes selected from levelling, flatting, printing, embossing, corroding, carving, brushing and crackling;
wherein the artistic effects are solid-colored or multi-colored, and the artistic effects form an integral body with the protection layer; and
wherein the protection layer is a single-layered or multi-layered structure.

2. The method for processing floorboards using digital printing of claim 1,
wherein the adhesion layer is transparent or solid-colored; and
wherein the method further comprises:
arranging a balance layer below the base material layer, wherein the balance layer is made of UV glue or various plastic films.

3. A method for processing floorboards using digital printing, comprising:
preparing a base material layer having a flat surface;
roll-coating a white UV paint with adhesion ability on an upper surface of the base material layer to form an adhesion layer, coating a UV balance layer on a bottom surface of the base material layer, and curing with a UV lamp;
printing patterns of a printing layer on a surface of the adhesion layer by a digital printing apparatus;
roll-coating a PUR glue on the patterns, cooling, drying and curing;
shower-coating a UV glue on the patterns to form a protection layer;
printing one or more layers of coating on portions designed to be stereoscopic on the protection layer, wherein the one or more layers of coating has the same color as the portions designed to be stereoscopic, wherein the one or more layers of coating is configured to enable the portions to sink so that a layering effect can be achieved, and half-curing with the UV lamp; and
forming stereoscopic patterns with depths different from that of sunken portions by printing a corrosive coating beyond the sunken portions, brushing off corroded portions with a fur brush after reaction, and curing with the UV lamp,
wherein the protection layer displays one or a combination of the artistic effects selected from flat, sunken, raised, finely creased, patterned and crackled by means of one or a combination of processes selected from levelling, flatting, printing, embossing, corroding, carving, brushing and crackling;
wherein the artistic effects are solid-colored or multi-colored, and artistic effects form an integral body with the protection layer; and
wherein the protection layer is a single-layered or multi-layered structure.

4. A method for processing floorboards using digital printing, comprising:
preparing a base material layer having a flat surface;
roll-coating a transparent UV paint with adhesion ability on an upper surface of the base material layer to form an adhesion layer, coating a UV balance layer on a bottom surface of the base material layer, and curing with a UV lamp;
printing patterns of a printing layer on a surface of the adhesion layer by a digital printing apparatus;
roll-coating a PUR glue on the patterns, cooling, drying and curing;
shower-coating a UV glue on the patterns to form a protection layer, and half- curing;
brushing the protection layer with a steel brush to form fine lines;
forming stereoscopic patterns with different depths by printing a corrosive coating on portions designed to be stereoscopic, adjusting a printing amount of the corrosive coating according to different depths, brushing off corroded portions with a fur brush, and half-curing with the UV lamp; and
roll-coating a UV protection layer on a surface of the stereoscopic patterns, and fully-curing with the UV lamp,
wherein the protection layer displays one or a combination of artistic effects selected from flat, sunken, raised, finely creased, patterned and crackled by means of one or a combination of processes selected from levelling, flatting, printing, embossing, corroding, carving, brushing and crackling;

wherein the artistic effects are solid-colored or multi-colored, and the artistic effects form an integral body with the protection layer; and wherein the protection layer is a single-layered or multi-layered structure.

5. A method for processing floorboards using digital printing, comprising:

preparing a base material layer having a flat surface;

roll-coating a UV paint with adhesion ability on an upper surface of the base material layer to form an adhesion layer, coating a UV balance layer on a bottom surface of the base material layer, and curing with a UV lamp;

printing patterns of a printing layer on a surface of the adhesion layer by a digital printing apparatus;

forming a protection layer the a surface of the patterns through roll-coating a UV glue, and curing with the UV lamp;

forming stereoscopic patterns by printing a raised layer of the UV glue on portions designed to be stereoscopic on the protection layer, and curing with the UV lamp; and spray-coating the UV glue on the stereoscopic patterns, and fully-curing with the UV lamp, wherein the protection layer displays one or a combination of artistic effects selected from flat, sunken, raised, finely creased, patterned and crackled by means of one or a combination of processes selected from levelling, flatting, printing, embossing, corroding, carving, brushing and crackling;

wherein the artistic effects are solid-colored or multi-colored, and the artistic effects form an integral body with the protection layer; and wherein the protection layer is a single-layered or multi-layered structure.

6. A method for processing floorboards using digital printing, comprising:

preparing a base material layer having a flat surface;

roll-coating a UV paint with adhesion ability on an upper surface of the base material layer to form an adhesion layer, coating a UV balance layer on a bottom surface of the base material layer, and curing with a UV lamp;

printing patterns of a printing layer on a surface of the adhesion layer by a digital printing apparatus, wherein portions designed to be stereoscopic are left blank;

forming a protection layer on a surface of the patterns through roll-coating a UV glue;

forming colored sunken patterns by printing on the portions designed to be stereoscopic with one or more colors, enabling the portions designed to be stereoscopic to sink, and half-curing with the UV lamp;

brushing the colored sunken patterns with a steel brush to form fine lines, and fully curing with the UV lamp; and roll-coating a UV protection layer on a surface of stereoscopic patterns, and fully- curing with the UV lamp, wherein the protection layer displays one or a combination of artistic effects selected from flat, sunken, raised, finely creased, patterned and crackled by means of one or a combination of processes selected from levelling, flatting, printing, embossing, corroding, carving, brushing and crackling;

wherein the artistic effects are solid-colored or multi-colored, and the artistic effects form an integral body with the protection layer; and wherein the protection layer is a single-layered or multi-layered structure.

7. A method for processing floorboards using digital printing, comprising:

preparing a base material layer having a flat surface;

roll-coating a UV paint with adhesion ability on an upper surface of the base material layer to form a adhesion layer, and curing with a UV lamp;

forming one or more tile patterns on a surface of an adhesion layer by a digital printing apparatus;

forming a protection layer on the one or more tile patterns through roll-coating a UV glue, and curing with the UV lamp;

printing a UV varnish on the one or more tile patterns to make the one or more tile patterns to raise, thereby forming an artistic effect resembling ceramic tiles with clear boundaries; and printing a UV material on the one or more tile patterns, thereby forming a concave-convex effect, and fully-curing with the UV lamp; wherein the density of the UV material is slightly higher than that of the UV varnish, a sunken effect is formed when the UV material is in contact with the UV varnish, wherein the protection layer displays one or a combination of artistic effects selected from flat, sunken, raised, finely creased, patterned and crackled by means of one or a combination of processes selected from levelling, flatting, printing, embossing, corroding, carving, brushing and crackling;

wherein the artistic effects are solid-colored or multi-colored, and the artistic effects form an integral body with the protection layer; and wherein the protection layer is a single-layered or multi-layered structure.

* * * * *